(12) United States Patent
Levander et al.

(10) Patent No.: US 7,862,393 B2
(45) Date of Patent: Jan. 4, 2011

(54) PROPULSION ARRANGEMENT

(75) Inventors: Oskar Levander, Turku (FI); Susanna Hannula, Turku (FI)

(73) Assignee: Wärtsilä Finland Oy, Vaasa (FI)

( * ) Notice: Subject to any disclaimer, the term of this patent is extended or adjusted under 35 U.S.C. 154(b) by 0 days.

(21) Appl. No.: 11/908,117

(22) PCT Filed: Nov. 23, 2005

(86) PCT No.: PCT/FI2005/050432

§ 371 (c)(1),
(2), (4) Date: Sep. 7, 2007

(87) PCT Pub. No.: WO2006/095042

PCT Pub. Date: Sep. 14, 2006

(65) Prior Publication Data

US 2008/0166934 A1    Jul. 10, 2008

(30) Foreign Application Priority Data

Mar. 10, 2005   (FI) .................................. 20055109

(51) Int. Cl.
*B63H 5/125* (2006.01)
(52) U.S. Cl. .................. 440/3; 440/6; 440/83
(58) Field of Classification Search .............. 440/3, 440/5, 67, 83, 667; 114/151
See application file for complete search history.

(56) References Cited

U.S. PATENT DOCUMENTS

| | | | |
|---|---|---|---|
| 3,230,698 A * | 1/1966 | Nettles | 60/718 |
| 3,703,642 A * | 11/1972 | Balaguer | 290/43 |
| 4,412,500 A | 11/1983 | Krautkremer et al. | |
| 4,565,534 A * | 1/1986 | Bland | 440/88 R |
| 4,734,065 A * | 3/1988 | Nakahama et al. | 440/1 |
| 4,747,796 A * | 5/1988 | Iwai et al. | 440/83 |
| 4,938,723 A * | 7/1990 | Yoshimura et al. | 440/52 |
| 5,616,056 A | 4/1997 | Meissner | |
| 5,941,744 A * | 8/1999 | Levedahl | 440/6 |
| 6,033,271 A | 3/2000 | Schafer | |
| 6,857,918 B1 | 2/2005 | Lebreux et al. | |

FOREIGN PATENT DOCUMENTS

| | | |
|---|---|---|
| DE | 10063338 | 6/2002 |
| EP | 1426287 | 6/2004 |
| JP | 58224892 A * | 12/1983 |
| JP | 08230785 | 9/1996 |

* cited by examiner

*Primary Examiner*—Ed Swinehart
(74) *Attorney, Agent, or Firm*—Chernoff, Vilhauer McClung & Stenzel

(57) ABSTRACT

The present invention relates to a propulsion arrangement for a marine vessel, which propulsion arrangement comprises an internal combustion engine, a shaft arrangement and a steerable thruster unit. The marine vessel further comprises an electric generator or a combined electric generator and motor in connection with the propulsion arrangement. In order to reduce space requirements and required equipment as well as to raise efficiency, the shaft arrangement comprises a main shaft extending from the internal combustion engine to a first angle gear and a drive shaft extending from the first angle gear to a second angle gear in the steerable thruster unit. The electric generator or the combined electric generator and motor is connected to the drive shaft of the shaft arrangement after the main shaft and the first angle gear are connected thereto.

6 Claims, 3 Drawing Sheets

PROPULSION ARRANGEMENT

This is a national stage application filed under 35 USC 371 based on International Application No. PCT/FI2005/050432 filed Nov. 23, 2005, and claims priority under 35 USC 119 of Finnish Patent Application No. 20055109 filed Mar. 10, 2005.

BACKGROUND OF THE INVENTION

The present invention relates to a propulsion arrangement for a marine vessel, which propulsion arrangement comprises an internal combustion engine, a shaft arrangement and a steerable thruster unit, whereby the marine vessel further comprises an electric generator or a combined electric generator and motor in connection with the propulsion arrangement.

Conventional marine vessels with the above type of propulsion arrangements and thereto related machinery may be provided with an additional device, particularly an electric generator or a combined electric generator and motor for generating e.g. hotel load electric power or for improving flexibility and redundancy in propulsion power. Such devices are often called shaft generators which, depending upon their location, may be used only as an electric generator or as an electric generator and an electric motor in combination.

Basically, an electric generator may be connected to the free end of the internal combustion engine, i.e. opposite the main shaft of the internal combustion engine, whereby no extra gear is necessary. This solution requires surplus space at the free end of the engine. Furthermore, such a generator can not provide power through the engine, i.e. it can not function as an electric motor. This type of single function arrangement is usually called a PTO (Power Take Off) arrangement.

Alternatively, a combined electric generator and motor may be connected to the main shaft of the internal combustion engine by means of a so-called step-up gear. Naturally the step-up gear necessitates additional equipment with thereto related costs. The step-up gear also causes transmission losses. Furthermore, this known solution requires sufficient and suitable space along the main shaft. This type of dual function arrangement is usually called a PTO/PTI (Power Take Off/Power Take In) arrangement.

However, in view of the general concepts discussed above, the additional device should be clearly understood as having three separate functions, i.e. firstly the additional device may installed to be used as an electric generator (PTO), secondly to be used mainly as an electric motor (PTI), and thirdly to be used as a combined electric generator and motor (PTO/PTI), whereby it may coupled so that it in a first mode functions as an electric generator and in a second mode as an electric motor.

The object of the present invention is to achieve a propulsion arrangement for a marine vessel by which the above disadvantages are avoided and which provides a multifunctional operation by way of a simplified arrangement.

SUMMARY OF THE INVENTION

The basic idea of the invention is to provide a propulsion system that includes an electric generator or a combined electric generator and motor and that may be directly employed also to the steerable thruster unit. This is realised by means of a propulsion arrangement, in which the shaft arrangement comprises a main shaft extending from the internal combustion engine to a first angle gear and a drive shaft extending from the first angle gear to a second angle gear in the steerable thruster unit. The electric generator or the combined electric generator and motor is connected to the drive shaft of the shaft arrangement, after the main shaft and the first angle gear connected thereto. The main shaft is thus free of any installations relating to the electric generator or the combined electric generator and motor.

According to an advantageous embodiment of the invention the electric generator is directly coupled to the drive shaft, above the first angle gear with respect to the steerable thruster unit. This eliminates any space requirements around the internal combustion engine or the main shaft.

According to another advantageous embodiment of the invention the electric generator is directly coupled to the drive shaft, above the first angle gear with respect to the thruster unit, and a coupling is provided on the drive shaft, between the electric generator and the first angle gear. In addition, this allows the internal combustion engine to drive the steerable thruster unit without turning the generator.

According to another advantageous embodiment of the invention the electric generator is directly coupled to the drive shaft, directly above the first angle gear with respect to the steerable thruster unit, and a coupling is provided on the drive shaft between the first angle gear and the second angle gear. In addition, this allows the internal combustion engine to turn the electric generator without driving the steerable thruster unit.

According to a further advantageous embodiment of the invention the combined electric generator and motor is directly coupled to the drive shaft, above the first angle gear with respect to the steerable thruster unit, and a coupling is provided on the main shaft, between the internal combustion engine and the first angle gear. This allows the combined electric generator and motor to drive the steerable thruster unit without turning the internal combustion engine.

According to an optional arrangement vis a vis the above mentioned further advantageous embodiment of the invention an auxiliary coupling may be provided between the combined electric generator and motor and the first angle gear. This additionally allows the internal combustion engine to drive the steerable thruster unit without turning the combined electric generator and motor.

According to another optional arrangement vis a vis the above mentioned further advantageous embodiment an auxiliary coupling may be provided between the first angle gear and the second angle gear. This additionally allows the internal combustion engine to turn the combined electric generator and motor without driving the steerable thruster unit.

The combined electric generator and motor may also be provided with a shaft section and a gear transmission, whereby it is connected to the drive shaft through the first angle gear by means of the gear transmission. The combined electric generator and motor is then preferably arranged on either side of or aft of the steerable thruster unit or the drive shaft, substantially in the plane of the main shaft and the first angle gear.

For this propulsion arrangement generally the main shaft is substantially horizontal or generally horizontally oriented, the drive shaft substantially vertical or generally vertically oriented, and the propeller shaft of the steerable thruster substantially horizontal or generally horizontally oriented, whereby transmission is provided through the first angle gear and the second angle gear as well as the angle transmission, when appropriate.

However, depending on the machinery arrangement, the main shaft may as well be inclined.

The coupling and auxiliary couplings are preferably so-called disconnecting couplings or flexible couplings and may be deployed according to the desired operational mode.

This simplifies the arrangements discussed above and reduces costs. Transmission losses also are reduced when the arrangements are used to drive the steerable thruster unit. No space is needed along the main shaft or at the free end of the internal combustion engine. On a whole, the invention also reduces the equipment on board the marine vessel.

BRIEF DESCRIPTION OF THE DRAWINGS

In the following the invention will be described, by way of example only, more in detail with reference to the accompanying schematic drawings, in which.

DETAILED DESCRIPTION

Figure 1:
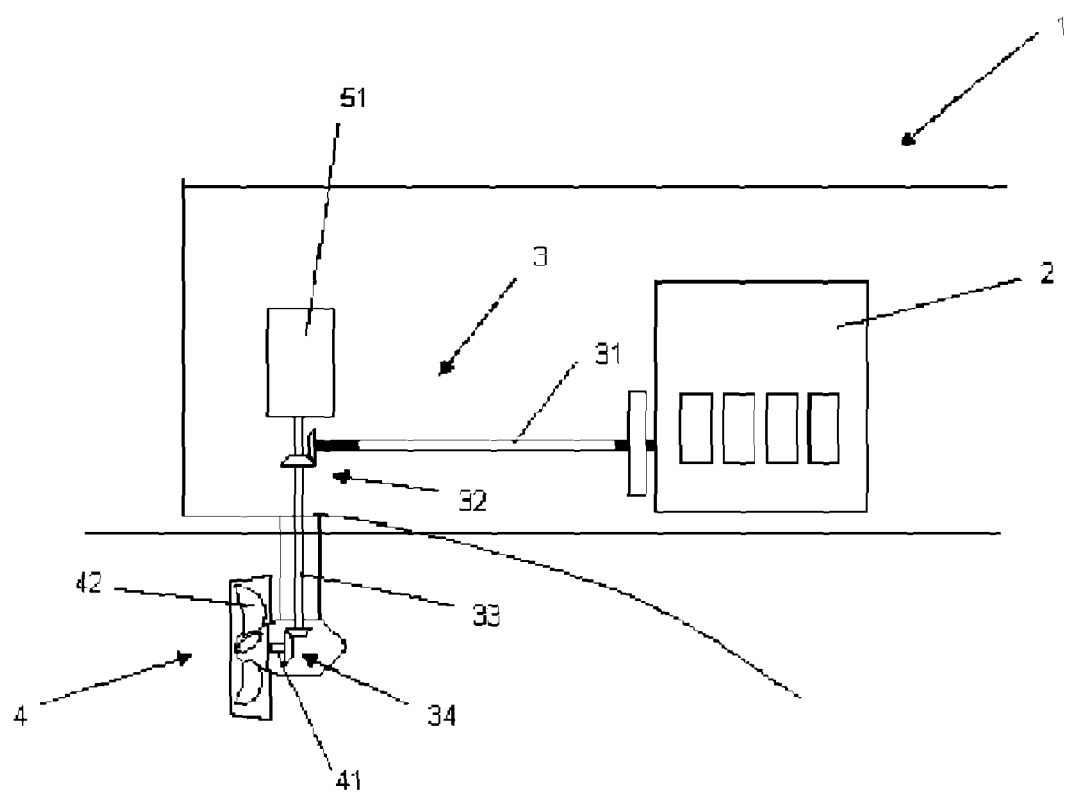
FIG. 1 shows a first embodiment of the present invention.

In the figures a marine vessel is generally indicated by reference numeral 1. The marine vessel 1 is provided with a propulsion arrangement comprising an internal combustion engine 2, typically a diesel engine, a shaft arrangement 3 and a steerable thruster unit 4. The shaft arrangement 3 includes a main shaft 31 extending from the internal combustion engine 2 to a first angle gear 32, which connects the main shaft 31 to a drive shaft 33, and a second angle gear 34 arranged in the steerable thruster unit 4. The second angle gear 34 connects the drive shaft 33 to a propeller shaft 41, with a propeller 42, in the steerable thruster unit 4.

Power is thus transmitted from the internal combustion engine 2 by means of the substantially horizontal or generally horizontally oriented main shaft 31 to the first angle gear 32, from the first angle gear 32 to the substantially vertical or generally vertically oriented drive shaft 33, which drives the second angle gear 34, which in turn drives the substantially horizontal or generally vertically oriented propeller shaft 41 with the propeller 42.

An arrangement of this type with steerable thruster units 4 is generally called a Z-drive due to its configuration.

In the embodiment of FIG. 1 the marine vessel 1 is provided with an electric generator 51 which is directly coupled to the drive shaft 33 and arranged directly above the first angle gear 32 with respect to the steerable thruster unit 4. In this arrangement the electric generator 51 always turns when the propeller 42 is turning, i.e. when the steerable thruster unit 4 is driven by the internal combustion engine 2. The electric generator 51 is coupled to the drive shaft 33 after the main shaft 31 and the first angle gear 32 connected thereto in the direction of transmission of power from the internal combustion engine to the propeller 42. Thereby the main shaft 31 is free from any connections with the electric generator 51, thus providing free space around the main shaft 31. This set-up provides a so-called secondary PTO.

Figure 2:
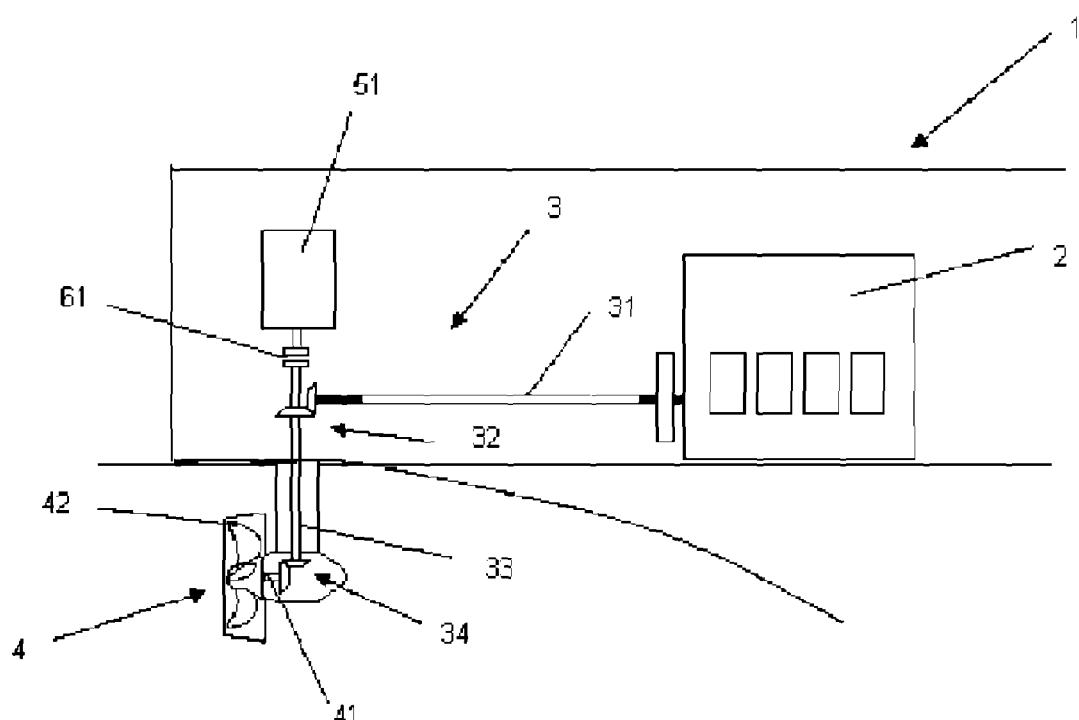
FIG. 2 shows a second embodiment of the present invention.

In the embodiment of FIG. 2 the marine vessel 1 is provided with an electric generator 51 which is directly coupled to the drive shaft 33 and arranged above the first angle gear 32 with respect to the steerable thruster unit 4. A coupling 61 is provided on the drive shaft 33 between the electric generator 51 and the first angle gear 32. When the coupling 61 is disconnected, the internal combustion engine 2 can drive the steerable thruster unit 4, i.e. the propeller 42, without turning the electric generator 51. The electric generator 51 is coupled to the drive shaft 33 after the main shaft 31 and the first angle gear 32 connected thereto in the direction of transmission of power from the internal combustion engine to the propeller 42. Thereby the main shaft 31 is free from any connections with the electric generator 51, thus providing free space around the main shaft 31.

Figure 3:
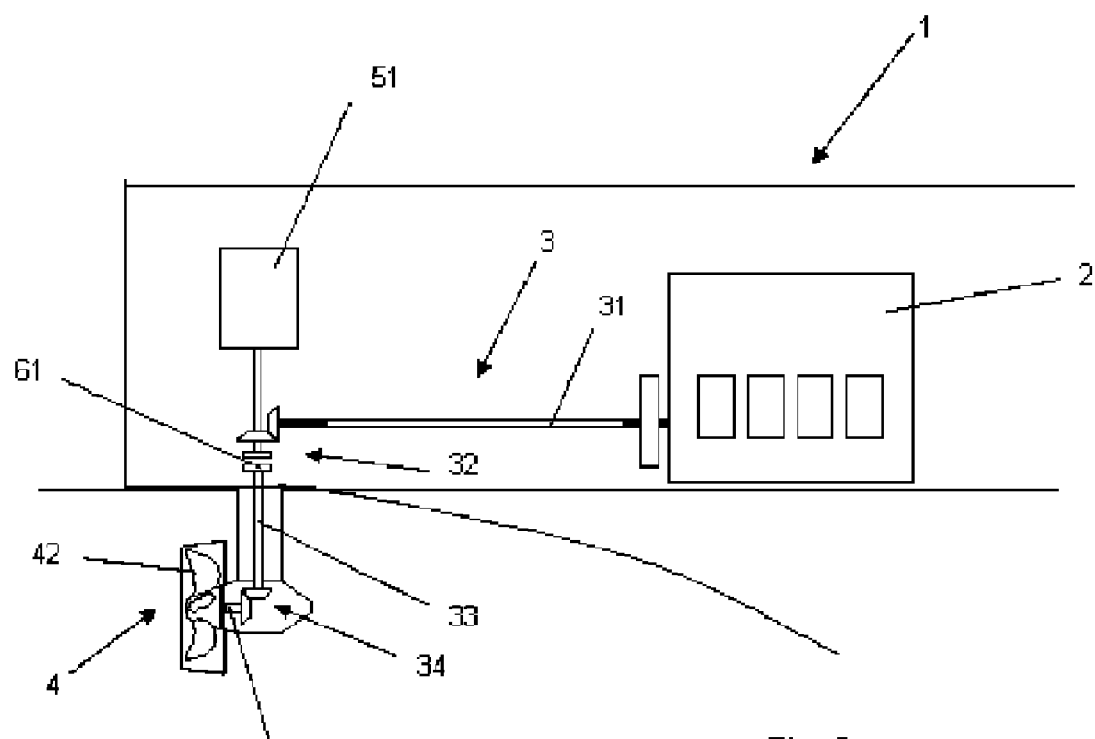
FIG. 3 shows a third embodiment of the present invention.

In the embodiment of FIG. 3 the marine vessel 1 is provided with an electric generator 51 which is directly coupled to the drive shaft 33 and arranged directly above the first angle gear 32 with respect to the steerable thruster unit 4. A coupling 61 is provided on the drive shaft 33 between the first angle gear 32 and the second angle gear 34. When the coupling 61 is disconnected the internal combustion engine 2 can turn the electric generator 51 without driving the steerable thruster unit 4, i.e. the propeller 42. The electric generator 51 is coupled to the drive shaft 33 after the main shaft 31 and the first angle gear 32 connected thereto in the direction of transmission of power from the internal combustion engine to the propeller 42. Thereby the main shaft 31 is free from any connections with the electric generator 51, thus providing free space around the main shaft 31. This set up provides a so-called primary PTO/PTI.

The electric generator 51 may be used for power take out, e.g. for the marine vessel hotel load.

Figure 4:
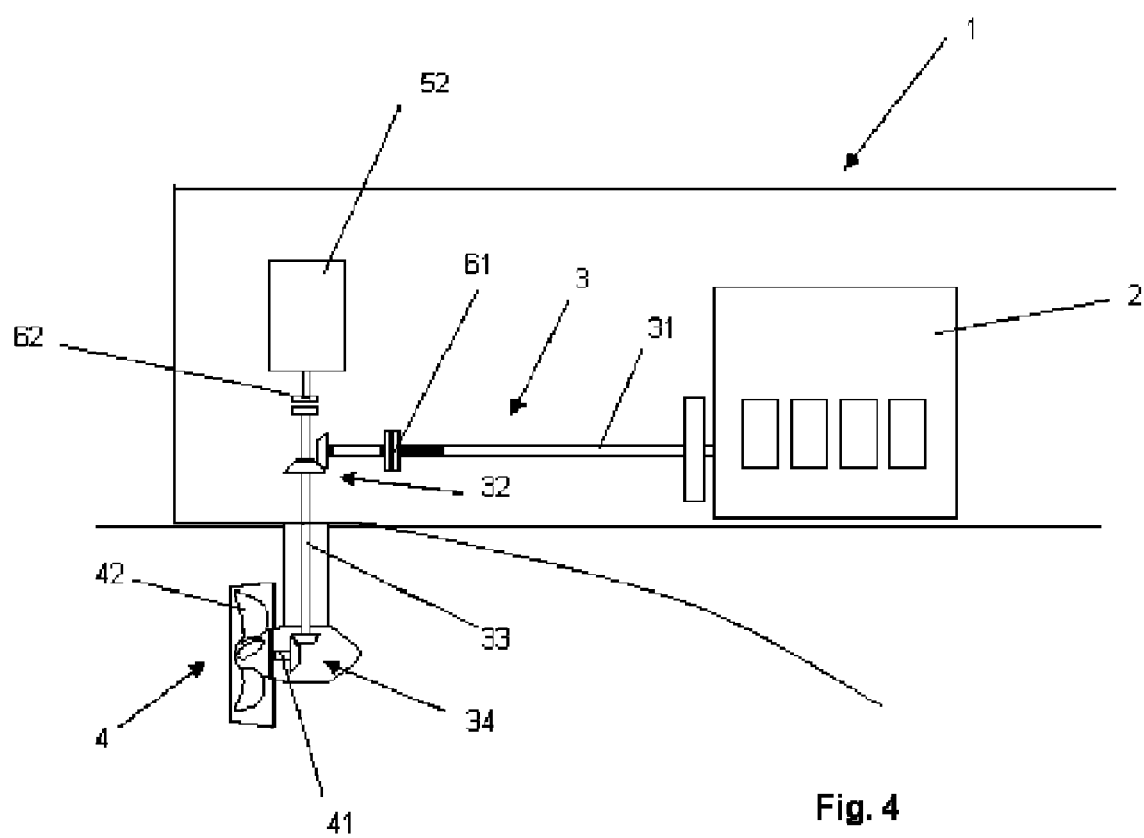
FIG. 4 shows a fourth embodiment of the present invention.

In the embodiment of FIG. 4 the marine vessel is provided with a combined electric generator and motor 52 which is directly coupled to the drive shaft and arranged above the first angle gear 32 with respect to the steerable thruster unit 4. A coupling 61 is provided on the main shaft 31 between the internal combustion engine 2 and the first angle gear 32. Due to this coupling the combined electric generator and motor 52 can drive the steerable thruster unit 4, i.e. the propeller 42, without turning the internal combustion engine 2.

An additional auxiliary coupling 62 may be provided on the drive shaft 33, between the combined electric generator and motor 52 and the first angle gear 32. This auxiliary coupling 62 allows the internal combustion engine 2 to drive the steerable thruster unit 4, i.e. the propeller 42, without turning the combined electric generator and motor 52.

The combined electric generator and motor 52 is coupled to the drive shaft 33 after the main shaft 31 and the first angle gear 32 connected thereto in the direction of transmission of power from the internal combustion engine to the propeller 42. Thereby the main shaft 31 is free from any connections with the combined electric generator and motor 52, thus providing free space around the main shaft 31.

Figure 5:
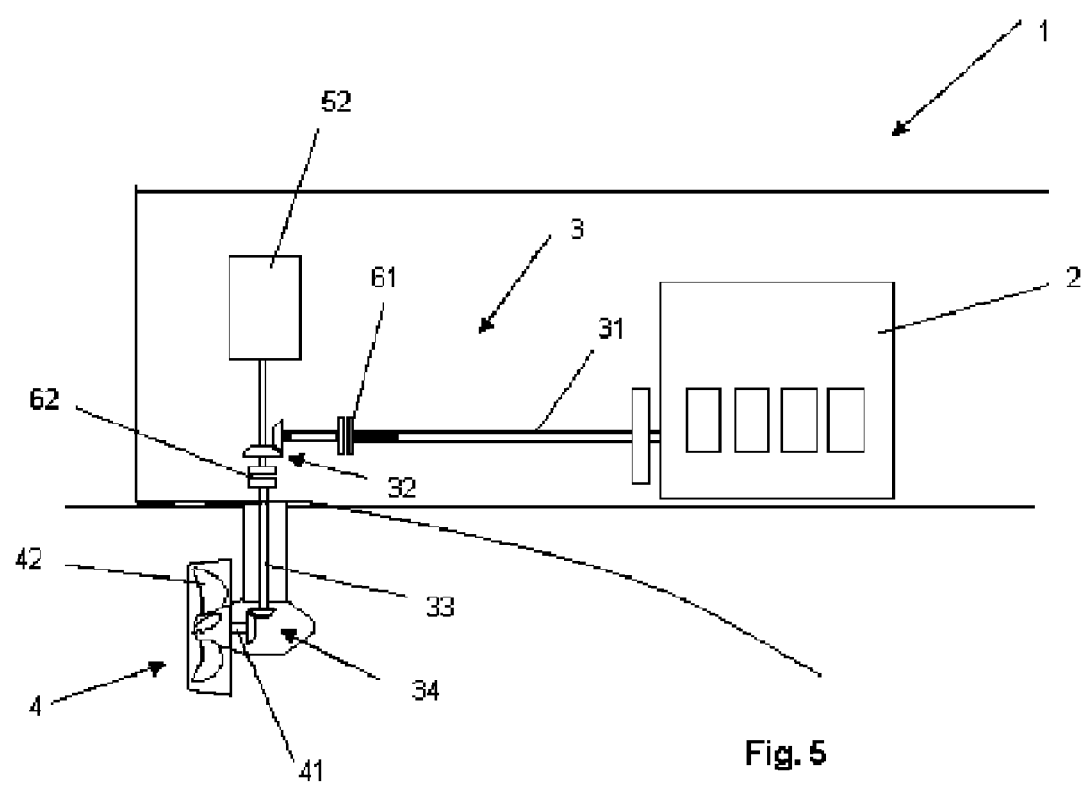
FIG. 5 shows a fifth embodiment of the present invention.

In the embodiment of FIG. 5 the marine vessel is provided with a combined electric generator and motor 52 which is directly coupled to the drive shaft and arranged directly above the first angle gear 32 with respect to the steerable thruster unit 4. A coupling 61 is provided on the main shaft 31 between the internal combustion engine 2 and the first angle gear 32. Due to this coupling the combined electric generator and motor 52 can drive the steerable thruster unit 4, i.e. the propeller 42, without turning the internal combustion engine 2.

An additional auxiliary coupling 62 may be provided on the drive shaft 33, between the first angle gear 32 and the second angle gear 34. This auxiliary coupling 62 allows the internal combustion engine 2 to turn the combined electric generator and motor 52, without driving the steerable thruster unit 4, i.e. the propeller 42. This arrangement provides a so-called primary PTO.

The combined electric generator and motor 52 is coupled to the drive shaft 33 after the main shaft 31 and the first angle gear 32 connected thereto in the direction of transmission of power from the internal combustion engine to the propeller 42. Thereby the main shaft 31 is free from any connections with the combined electric generator and motor 52, thus providing free space around the main shaft 31.

The embodiments discussed in FIGS. 4 and 5 above may as well be carried out without the auxiliary coupling 62 providing the options also described above. The auxiliary coupling is thus optional.

Figure 6:
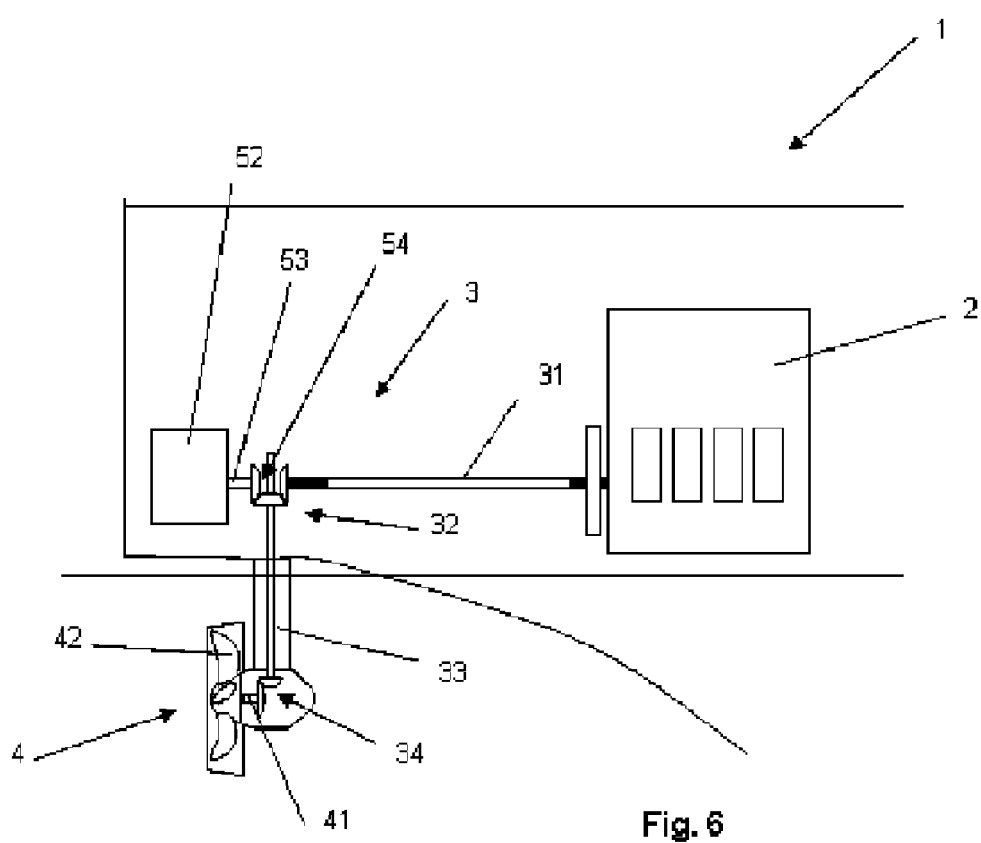
FIG. 6 shows a sixth embodiment of the present invention.

FIG. 6 shows another arrangement, in which the marine vessel 1 is provided with a combined electric generator and motor 52 which by a shaft section 53 and a transmission gear 54 is connected to the first angle gear 32 of the shaft arrangement 3. In this embodiment the combined electric generator and motor 52 is situated aft of the steerable thruster unit 4, or the drive shaft 33, i.e. opposite the main shaft 31 substantially aligned or in the same plane as the main shaft 31. It is clear that the combined electric generator and motor 52 also may be on either side of the steerable thruster unit 4, or in any in between position around the first angle gear 32, and that it need not be in the same plane as the main shaft 31.

The combined electric generator and motor 52 may be used for power take out, e.g. for the marine vessel hotel load, or it can be used alone or in combination with the internal combustion engine 2 to drive the steerable thruster unit 4.

The combined electric generator and motor 52 is coupled to the drive shaft 33 after the main shaft 31 and the first angle gear 32 connected thereto in the direction of transmission of power from the internal combustion engine to the propeller 42. Thereby the main shaft 31 is free from any connections with the combined electric generator and motor 52, thus providing free space around the main shaft 31.

The electric generator or the combined electric generator could be of a modified type, whereby it could be made to rotate without producing electricity.

The attached drawings and the description related thereto are only intended for clarification of the basic idea of the invention. The invention may vary in further detail within the scope of the ensuing claims.

The invention claimed is:

1. Propulsion arrangement for a marine vessel, which propulsion arrangement comprises an internal combustion engine, a shaft arrangement and a steerable thruster unit,
   wherein the shaft arrangement comprises a substantially horizontal main shaft extending from the internal combustion engine to a first angle gear transmission,
   a coupling is provided on the substantially horizontal main shaft, between the internal combustion engine and the first angle gear transmission,
   a substantially vertical drive shaft extends from the first angle gear transmission to a second angle gear transmission in the steerable thruster unit,
   the steerable thruster unit comprises a substantially horizontal propeller shaft with a propeller,
   the marine vessel further comprises a combined electric generator and motor arranged above the first angle gear transmission and arranged to be coupled to the propulsion arrangement,
   the combined electric generator and motor is arranged to be coupled to the substantially vertical drive shaft after the substantially horizontal main shaft and the first angle gear transmission in the direction of transmission of power from the internal combustion engine,
   and an auxiliary coupling is provided on the substantially vertical drive shaft, between the combined electric generator and motor and the first angle gear transmission.

2. Propulsion arrangement according to claim 1, wherein the first angle gear transmission is arranged to provide transmission from the substantially horizontal main shaft to the substantially vertical drive shaft, and the second angle gear transmission is arranged to provide transmission from the substantially vertical drive shaft to the substantially horizontal propeller shaft.

3. Propulsion arrangement according to claim 1, wherein the substantially vertical drive shaft comprises a first shaft segment that is coupled directly to the combined electric motor and generator and extends from the combined electric generator and motor to the auxiliary coupling, and a second shaft segment that extends from the auxiliary coupling to the second angle gear transmission and is connected to the main shaft by the first angle gear transmission.

4. Propulsion arrangement for a marine vessel, which propulsion arrangement comprises an internal combustion engine, a shaft arrangement and a steerable thruster unit,
   wherein the shaft arrangement comprises a substantially horizontal main shaft extending from the internal combustion engine to a first angle gear transmission,
   a coupling is provided on the substantially horizontal main shaft, between the internal combustion engine and the first angle gear transmission,
   a substantially vertical drive shaft extends from the first angle gear transmission to a second angle gear transmission in the steerable thruster unit,
   the steerable thruster unit comprises a substantially horizontal propeller shaft with a propeller,
   the marine vessel further comprises a combined electric generator and motor arranged above the first angle gear transmission and arranged to be coupled to the propulsion arrangement,
   the combined electric generator and motor is arranged to be coupled to the substantially vertical drive shaft after the substantially horizontal main shaft and the first angle gear transmission in the direction of transmission of power from the internal combustion engine,
   and an auxiliary coupling is provided on the substantially vertical drive shaft, between the first angle gear transmission and the second angle gear transmission.

5. Propulsion arrangement according to claim 4, wherein the first angle gear transmission is arranged to provide transmission from the substantially horizontal main shaft to the substantially vertical drive shaft, and the second angle gear transmission is arranged to provide transmission from the substantially vertical drive shaft to the substantially horizontal propeller shaft.

6. Propulsion arrangement according to claim 4, wherein the substantially vertical drive shaft comprises a first shaft segment that is coupled directly to the combined electric motor and generator and extends from the combined electric generator and motor to the auxiliary coupling and is connected to the main shaft by the first angle gear transmission, and a second shaft segment that extends from the auxiliary coupling to the second angle gear transmission.

\* \* \* \* \*